April 1, 1969 A. DUNCAN 3,436,118
TRACTOR CABS
Filed Dec. 23, 1966 Sheet 1 of 2
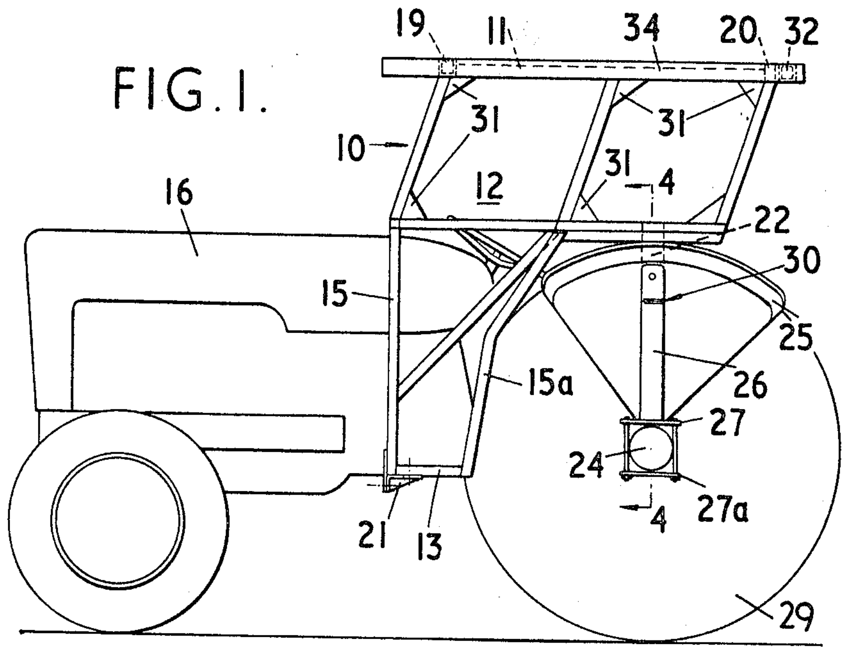
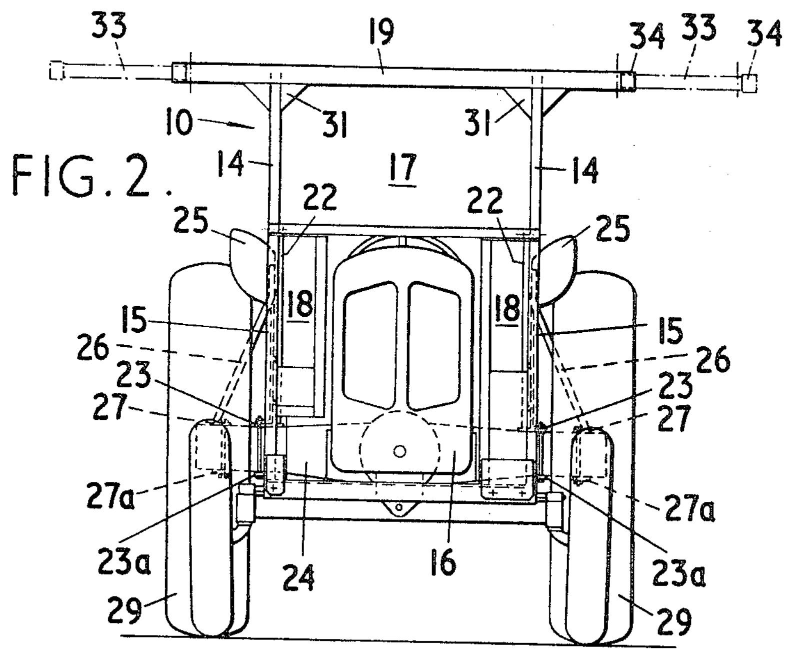

33
34
33
29
26
19
11
22
23
21
20
32
16
23
22
11
29
26
27
33
34
33

14
12
25
30
25
26
23
27
27a
24
23a
28
29

United States Patent Office 3,436,118
Patented Apr. 1, 1969

1

3,436,118
TRACTOR CABS
Alexander Duncan, Inchbroom, Nigg, Kincardineshire, Scotland
Filed Dec. 23, 1966, Ser. No. 604,376
Claims priority, application Great Britain, July 27, 1966, 33,779/66
Int. Cl. B62d *25/06*
U.S. Cl. 296—102 1 Claim

ABSTRACT OF THE DISCLOSURE

The invention consists in a tractor cab provided with a fabricated frame anchored at its forward end to the chassis of the tractor and supported over the rear axle by two side supports each comprising a straight upright which extends close to the inner face of the adjacent wheel wing or guard. Each upright has a sole plate anchored to the rear axle casing and a strut member which extends into the well of the adjacent wheel. The lower end of the strut member is anchored to the said casing while its upper end bears on the outer face of the adjacent wheel wing or guard. Each upright and strut with wheel wing or guard sandwiched therebetween are secured together by bolts and nuts.

This invention has reference to tractor cabs, such cabs being fitted to tractors to protect the drivers from the elements.

Tractors when traversing rough or hilly ground are liable to turn on their side and may even roll. In consequence in order to protect the driver the cab must be of sufficient strength to prevent it being substantially distorted in the aforesaid eventuality.

The present invention has therefore for its object to provide improvements designed to impart rigidity or strength to the cab without encroaching in the space within the cab.

According to the present invention a tractor cab is provided with a fabricated frame anchored at its forward end to the chassis of the tractor and supported over the rear axle by two side supports each comprising a straight upright which extends close to and above the inner face of the adjacent wheel wing or guard and which has a sole plate anchored to the rear axle casing and a strut member which extends into the well of the adjacent wheel, the lower end of the strut member being anchored to the said casing while its upper end bears on the outer face of the adjacent wheel wing or guard, each upright and upper end of its strut with wheel wing or guard sandwiched therebetween being secured together by bolts and nuts.

A preferred embodiment of the invention will now be described with reference to the accompanying drawings wherein:

FIGURE 1 is an elevation of the cab mounted on a tractor, the near rear wheel of the tractor being omitted;

FIGURE 2 is an end view of FIGURE 1;

Figure 3:
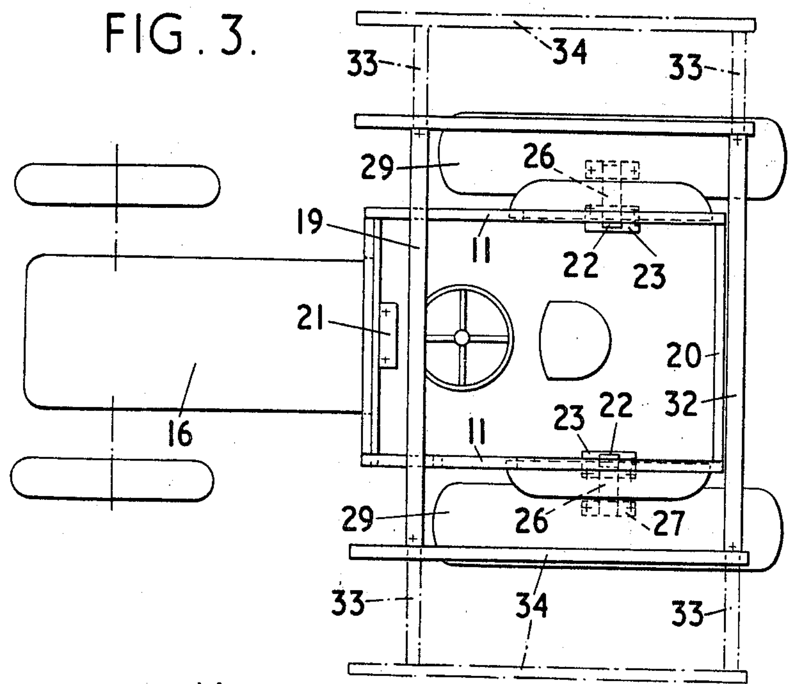
FIGURE 3 is a plan view thereof.
Figure 4:
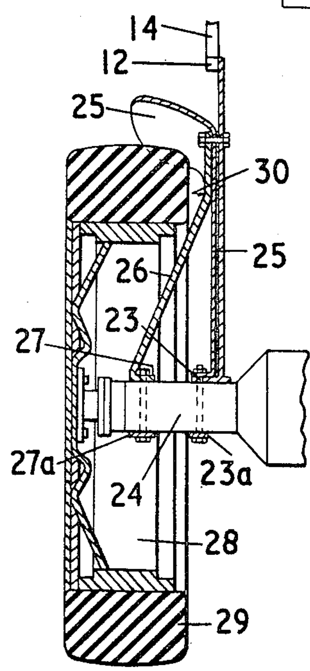
FIGURE 4 is a section on the line 4—4 of FIGURE 1.

As shown in the drawings the improved cab is provided with a fabricated metal frame 10 the two sides of which are of inverted L formation. Each side frame is formed

2 by an upper horizontal member 11, a lower horizontal member 12, a relatively short horizontal member 13 located at the foot of the cab, uprights 14 connecting the upper and lower members 11 and 12 and uprights 15 and 15*a* interconnecting the members 12 and 13. The uprights 14 together with the horizontal members 11 and 12 form openings which may be glazed or covered by panels. One of the sides may incorporate a hinged door, not shown.

The top of the two side frames are interconnected by a front and a rear transversely extending member designed 19 and 20 respectively. The members constituting the side frames and also the transverse members are all of hollow square section.

The front of the fabricated metal frame forms an opening to receive the engine of a tractor 16. It also forms an opening 17 for the reception of a wind-screen and side openings 18 which may be glazed or covered by panels.

The front of the fabricated frame carries a sole plate 21 located at the foot thereof which plate is bolted to the chassis of the tractor and thereby supports the front of the cab. The cab is further supported by means of two uprights 22, 22, each of which at its lower end forms or is provided with a sole plate 23. The sole plates are bolted to the rear axle casing 24 by means of bolts extending between the sole plates and clamping plates 23*a* which bear on the underside of rear axle casing. Each upright 22 extends closely adjacent to the inner face of the adjacent wheel wing or guard 25 and at its upper end is secured to the horizontal member 12 of the adjacent side frame. Said uprights thereby support the cab. The wheel wings or guards are bolted to the sole plates 23.

Each upright is supported by a strut 26 which extends into the wheel well 28 of the adjacent rear wheel 29 of the tractor. The lower end of each strut forms or is secured to a sole plate 27 which rests on the rear axle casing where it extends into the well and to which it is bolted, the bolts passing through the sole plate and a clamping plate 27*a* bearing on the under face of said casing. The upper end of each strut is angled as at 30 to lie flush with the outer face of the adjacent wheel wing or guard near the top thereof.

The uprights 22 and struts 26 at each side with the wheel wing or guard 25 sandwiched therebetween are bolted together.

Corners of the fabricated cab frame are reinforced by gusset plates 31.

The cab is thereby very rigidly supported. As the upright supports 22 are located closely adjacent to the inner faces of the wheel wings or guards the space they occupy within the cab is practically negligible.

The cab is, in fact, rendered sufficiently rigid to prevent it being distorted to an extent which would result in injury to the driver in the event of the tractor falling on its side.

The transverse member 19 at both ends thereof may extend beyond the cab so that said member then constitutes an anti-roll bar to prevent the tractor rolling if it should fall on its side when travelling over inclined ground. A further anti-roll bar 32 may be secured to the cross member 20.

If desired rods 33 may be telescoped within said member 19 and the anti-roll bar 32 and said rods interconnected by longitudinally extending bars 34. Where the contour of the ground renders it advisable to do so said telescopic bars can be extended as indicated in dotted lines. Where there is no danger of the tractor rolling the telescopic rods and interconnected bars 34 may be removed.

What I claim is:

1. A tractor cab provided with a fabricated frame anchored at its forward end to the chassis of the tractor and supported over the rear axle by two side supports each comprising a straight upright which extends close to and above the inner face of the adjacent wheel wing or guard and which has a sole plate anchored to the rear axle casing and a strut which extends into the well of the adjacent wheel, the lower end of the strut member being anchored to the said casing while its upper end bears on the outer face of the adjacent wheel wing or guard, each upright and the upper end of its strut with wheel wing or guard sandwiched therebetween being secured together by bolts and nuts.

References Cited

UNITED STATES PATENTS

| | | | |
|---|---|---|---|
| 1,491,306 | 4/1924 | Kirkham | 296—102 |
| 2,715,044 | 8/1955 | Neidetcher | 296—102 |
| 2,729,462 | 1/1956 | Maybrier | 280—150 |
| 3,070,401 | 12/1962 | Komenda | 296—102 |
| 3,244,251 | 4/1966 | Duncan | 296—102 |
| 3,306,625 | 2/1967 | Ottosson | 280—150 |

LEO FRIAGLIA, *Primary Examiner.*

J. E. SIEGEL, *Assistant Examiner.*